No. 697,829. Patented Apr. 15, 1902.
C. H. FRALEY & G. F. MILLER.
CONVERTING MOTION.
(Application filed Jan. 18, 1902.)
(No Model.) 2 Sheets—Sheet 1.
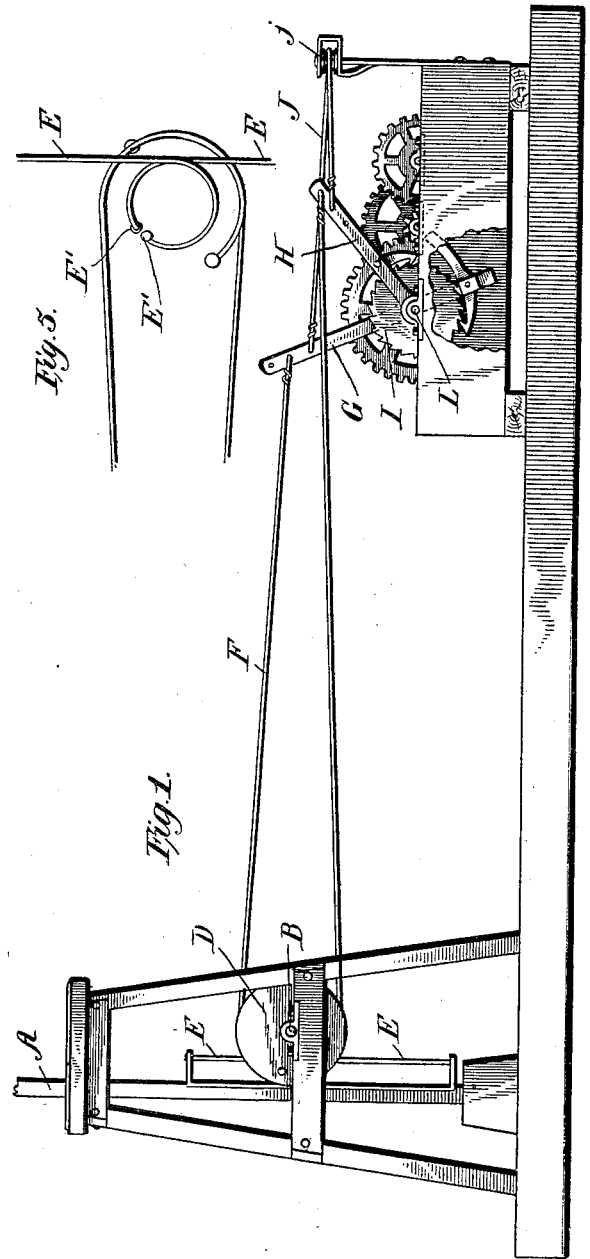
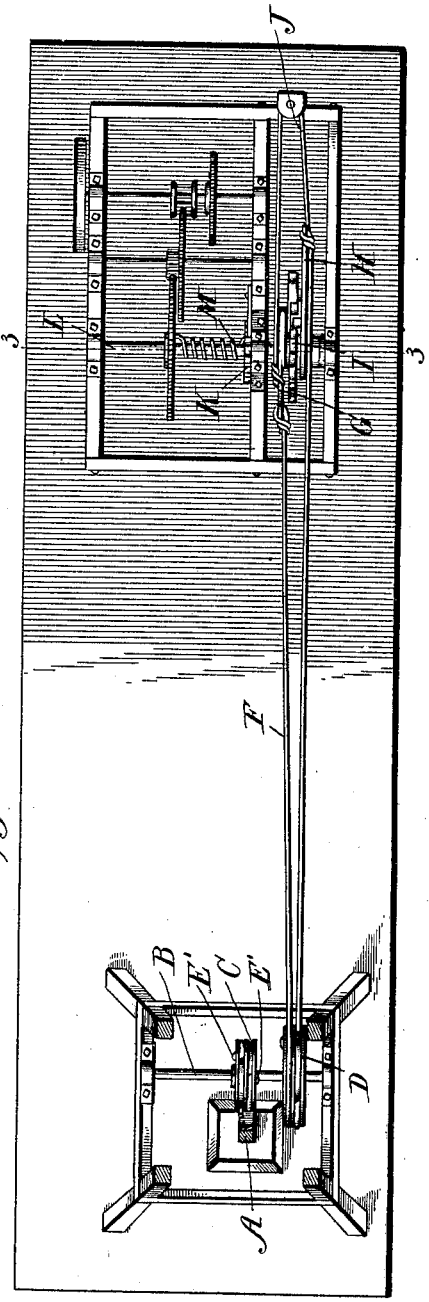
WITNESSES:
Geo. P. Kingsbury
Perry B. Lumpkin
INVENTORS
Casper H. Fraley.
Geo. F. Miller.
By Munn & Co.
ATTORNEYS No. 697,829. Patented Apr. 15, 1902.
C. H. FRALEY & G. F. MILLER.
CONVERTING MOTION.
(Application filed Jan. 18, 1902.)

(No Model.) 2 Sheets—Sheet 2.

WITNESSES:
Geo. P. Kingsbury.
Perry B. Turpin.

INVENTORS
Casper H. Fraley.
Geo. F. Miller.
By Munn & Co,
ATTORNEYS

UNITED STATES PATENT OFFICE.

CASPER H. FRALEY AND GEORGE F. MILLER, OF ALMA, NEBRASKA.

CONVERTING MOTION.

SPECIFICATION forming part of Letters Patent No. 697,829, dated April 15, 1902.

Application filed January 18, 1902. Serial No. 90,277. (No model.)

*To all whom it may concern:*

Be it known that we, CASPER H. FRALEY and GEORGE F. MILLER, citizens of the United States, and residents of Alma, in the county of Harlan and State of Nebraska, have made certain new and useful Improvements in Converting Motion, of which the following is a specification.

This invention is an improvement in apparatus for converting motion, having for an object to provide means whereby reciprocating motion can be converted into rotary motion; and the invention consists in certain novel constructions and combinations of parts, as will be hereinafter described and claimed.

Figure 3:
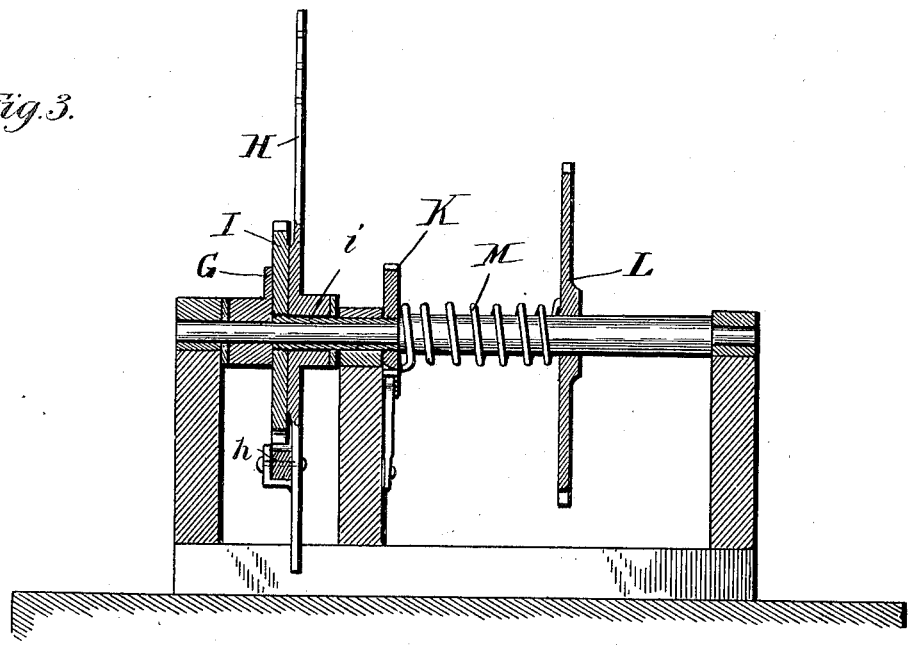
Figure 4:
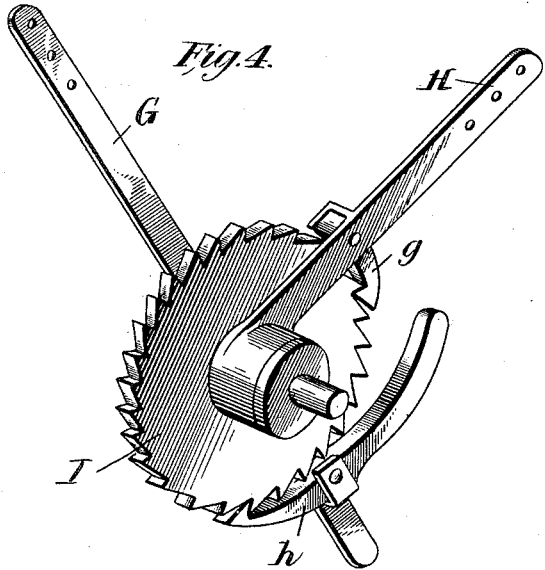

In the drawings, Figure 1 is a side view, and Fig. 2 a top plan view, of an apparatus embodying our invention. Fig. 3 is a cross-sectional view on about line 3 3 of Fig. 2. Fig. 4 is a detail perspective view of the main ratchet-wheel and its pawls. Fig. 5 is a detail diagrammatic view showing the connection of the cords or cables with their drums, and Fig. 6 illustrates a somewhat different construction.

By our invention we convert the reciprocating movement of a rod A, which may be driven by a windmill or in other suitable manner, into rotary movement. The rod A is guided vertically in a suitable frame and extends adjacent to a shaft B, on which is fixed drums C and D, the latter being larger than the drum C, as shown in Fig. 2. Cords or cables are connected with the said drums, the cords E being secured at E' to the drum C, extended around the same in reverse directions, and secured to the rod A above and below the pinion, as shown in Fig. 1, so the rod A as it is reciprocated will oscillate the drum C. While we have shown the cable E as made in two lengths secured separately at E' to the drum C and have represented the said drum as provided with separate grooves to receive the separate lengths of the cable E, it will be understood that where desired the said cable may be made in one piece and wound around the drum C and suitably secured thereto. The drum D is preferably larger than the drum C, as shown, and has the two grooves to receive the length of the cable F which connects the drum B with the pawl-levers G and H, which are provided with pawls g and h, operating upon the main ratchet-wheel I. We also employ a cable J, connected at its opposite ends with the pawl-levers G and H and passed between its ends around a guide j. We thus provide cable devices connecting the pawl-levers with the drum D and also connecting said pawl-levers with each other, the latter connection being suitably guided, and it will be understood that instead of employing separate cables F and J, as described, a single cable might be employed and be secured to the levers G and H and pass thence around the guide j.

In the operation of the described construction it will be noticed that as the rod A is reciprocated it will oscillate the pinion C, and thus cause the pinion D to oscillate, thus effecting a rocking of the pawl-levers G and H, which, operating through their pawls upon the main ratchet-wheel I, will turn said wheel and the shaft to which it is fixed. In this operation the levers G and H will be positively operated in one direction by the cable F and in the other direction by the connection of the said levers with each other by means of the cable J, as before described. The sleeve i, to which the ratchet-wheel I is fixed, has also fixed to it a ratchet-wheel K, which is connected with the gear L of a gear-train by means of a spring M, so as to ease the jar in starting the machine. The gear L may be geared up with any suitable train and for any desired purpose.

Figure 6:
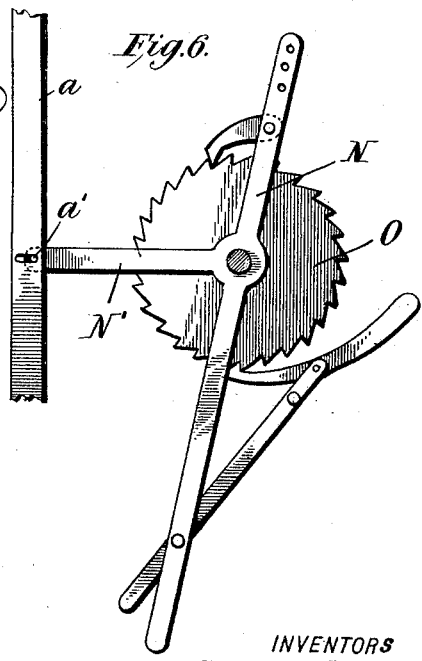

When it is desired to convert the motion by means of apparatus located within the tower of the windmill, an apparatus such as shown in Fig. 6 may in some instances be employed. In this construction the reciprocating rod a operates at a' upon a crank-arm N' of a pawl-carrying lever N, whose pawls operate upon the ratchet-wheel O, the operation being such as to cause a turning of the ratchet-wheel as the rod a is reciprocated.

Having thus described our invention, what we claim as new, and desire to secure by Letters Patent, is—

1. The apparatus for converting motion substantially as herein described consisting of the reciprocating rod, a drum, a cord connection between the drum and the rod whereby the rod as it is reciprocated will oscillate said drum, a second drum in connection with said first drum and oscillating therewith, a main ratchet-wheel, a gear, a spring connection between the gear and the ratchet-wheel, pivoted pawl-levers provided with pawls engaging said main ratchet, a cable connecting said levers, a guide for said cable, and cable connections between each of said levers and the second drum all substantially as and for the purposes set forth.

2. In an apparatus substantially as described the combination with a main ratchet-wheel and the pawl-levers provided with pawls and operating thereon, of means for operating said levers, a device arranged for operation by the main ratchet-wheel, and a spring connection between said device and the main ratchet-wheel substantially as set forth.

3. The combination of the reciprocating rod, the drum adjacent thereto, the cord connection between the drum and rod whereby the rod may oscillate the drum, a second drum in connection with the first drum, the main ratchet-wheel, the levers having pawls operating upon said ratchet-wheel, and cable connections between said levers and the second drum substantially as set forth.

4. The combination with the main ratchet-wheel of pawls operating upon the said wheel, lever devices carrying said pawls, the reciprocating rod, and intermediate devices between said rod and the lever devices substantially as set forth.

CASPER H. FRALEY.
GEORGE F. MILLER.

Witnesses:
GEO. H. CLEANER,
JOSHUA A. BROWN.